(12) United States Patent
Arthaber (10) Patent No.: US 9,471,820 B2
(45) Date of Patent: Oct. 18, 2016

(54) METHOD AND SYSTEM FOR LOCATING OBJECTS

(75) Inventor: Holger Arthaber, Vienna (AT)

(73) Assignee: TECHNISCHE UNIVERSITÄT WIEN, Vienna (AT)

( * ) Notice: Subject to any disclaimer, the term of this patent is extended or adjusted under 35 U.S.C. 154(b) by 235 days.

(21) Appl. No.: 14/237,131

(22) PCT Filed: Jul. 31, 2012

(86) PCT No.: PCT/EP2012/064957
§ 371 (c)(1),
(2), (4) Date: Jul. 30, 2014

(87) PCT Pub. No.: WO2013/017596
PCT Pub. Date: Feb. 7, 2013

(65) Prior Publication Data
US 2014/0253296 A1    Sep. 11, 2014

(30) Foreign Application Priority Data

Aug. 4, 2011 (AT) ................ A 1128/2011

(51) Int. Cl.
| | |
|---|---|
| *G06K 7/10* | (2006.01) |
| *G01S 13/75* | (2006.01) |
| *G01S 13/82* | (2006.01) |
| *G01S 13/87* | (2006.01) |

(52) U.S. Cl.
CPC ......... *G06K 7/10366* (2013.01); *G01S 13/751* (2013.01); *G01S 13/825* (2013.01); *G01S 13/878* (2013.01)

(58) Field of Classification Search
CPC .. G01S 13/751; G01S 13/758; G01S 13/874; G01S 13/878; G06K 7/0008; G06K 7/10029; G06K 7/10079
See application file for complete search history.

(56) References Cited

U.S. PATENT DOCUMENTS

| | | | | |
|---|---|---|---|---|
| 4,963,872 A | * | 10/1990 | Schneider ............. | H03K 5/086 341/118 |
| 2006/0007036 A1 | | 1/2006 | Natsume et al. | |
| 2006/0232447 A1 | * | 10/2006 | Walker ............... | H04L 27/3488 341/50 |

(Continued)

FOREIGN PATENT DOCUMENTS

| | | |
|---|---|---|
| DE | 10 2009 008 174 A1 | 8/2010 |
| EP | 0 638 871 A2 | 2/1995 |
| WO | 2011/043091 A1 | 4/2011 |

OTHER PUBLICATIONS

International Search Report, mailed Oct. 29, 2012, for PCT/EP2012/064957, 3 pages.

(Continued)

*Primary Examiner* — Nabil Syed
(74) *Attorney, Agent, or Firm* — Seed IP Law Group PLLC (57) ABSTRACT

Method and systems for locating objects, in particular RFID tags, employ one or more RFID reading devices. The methods and/or systems make it possible to determine a distance between an RFID reading device and a deliberately selected RFID tag in a simple, robust manner. The RFID reading device determines a propagation time of a broadband signal by comparing the broadband signal with the scattered broadband signal. The RFID reading device determines a distance between the RFID reading device and the RFID tag from the propagation time difference.

18 Claims, 4 Drawing Sheets

(56) References Cited

U.S. PATENT DOCUMENTS

| | | | |
|---|---|---|---|
| 2007/0109099 A1* | 5/2007 | Raphaeli | G01S 13/758 340/10.2 |
| 2008/0143482 A1 | 6/2008 | Shoarinejad et al. | |
| 2008/0165058 A1 | 7/2008 | Ayachitula et al. | |
| 2010/0156651 A1 | 6/2010 | Broer | |
| 2012/0176272 A1 | 7/2012 | Hirata et al. | |

OTHER PUBLICATIONS

Written Opinion, mailed Oct. 29, 2012, for PCT/EP2012/064957, 8 pages.

* cited by examiner

METHOD AND SYSTEM FOR LOCATING OBJECTS

The invention relates to a method for locating objects, in particular RFID tags, and to a system for locating RFID tags using at least one RFID reading device.

RFID (radio-frequency identification) systems have been known from the prior art for decades and are used to identify or locate objects or living beings. An RFID system consists of an RFID tag, which is located on or in the object or living being to be identified or located and may contain an identifying code, and an RFID reading device for reading this information.

RFID tags may be smaller than a grain of rice and may be adhesively bonded to objects, fitted in another form or implanted in living beings. There is also the possibility of producing RFID tags using special printing methods. The advantages of this technology result from the combination of the small size, the inconspicuous reading possibility and the low price of the RFID tags (sometimes in the cents range). As a result, this technology lends itself to replacing the still widespread barcodes, for example.

The RFID reading device is coupled to the RFID tag by means of alternating electromagnetic fields which are generated by the RFID reading device and the intensity and frequency range of which are dependent on the application.

These alternating fields can be used to transmit data and to supply the RFID tags with electrical energy in the case of short distances. If longer ranges are intended to be achieved and the costs of the RFID tags are not critical, active RFID tags with their own energy supply can be used.

For querying, the RFID reading device generates a radio-frequency alternating electromagnetic field to which the RFID tag is exposed. The radio-frequency energy received by it via the antenna can be used as an energy supply during the communication process. In the case of active tags, energy can also be supplied by means of an installed battery. In the case of semi-active tags, the battery only supplies a microchip on the RFID tag.

The RFID tag possibly decodes the commands transmitted by the reading device and codes and modulates its response into the radiated electromagnetic field by changing its antenna impedance and reflecting the field emitted by the reading device. This is generally not an active transmitting operation but rather modulated back-scattering of the received signal.

Depending on the type, RFID tags operate in the long-wave range at 125-134 kHz, in the short-wave range at 13.56 MHz, in the UHF range at 865-869 MHz (European frequencies) and 902-928 MHz (American and Asian frequency bands) or in the SHF range at 2.45 GHz and 5.8 GHz.

High-frequency (HF) tags use load modulation, that is to say they use part of the energy of the alternating magnetic field by means of short-circuiting. This can be detected by the reading device, but also, in theory, by a receiver which is further away. The antennas of an HF tag form an induction coil having a plurality of turns.

In contrast, ultra-high-frequency (UHF) tags operate in the electromagnetic far field in order to receive and transmit the response. The antennas are usually linear, folded, circular or spiral dipoles and the chip usually sits in the center between the dipole arms of the RFID tag.

Detection of the position of RFID tags is an essential prerequisite for a multiplicity of applications in the field of logistics, goods tracking, people tracking, in toll methods, access systems, for determining the authorization of people, for detecting theft, etc. In principle, it is known practice to determine the propagation time of the signal by comparing the signal transmitted by the RFID reading device with the signal reflected or back-scattered by the RFID tag and to determine the distance between the RFID reading device and the RFID tag from said propagation time. In this case, the comparison may be based on a comparison of the field strength, the power or the phase shift. However, such methods are very susceptible to interference, in particular on account of the fact that reflections always also occur from other sources, such as any type of obstacle.

In order to rectify these problems, a combined angle and distance measurement can be carried out. For example, a plurality of antennas (for example an antenna array) can be fitted to a reading device and an angular range of the back-scattered signal can be determined therefrom. At least two antennas are required for determining an angle in one plane, whereas at least three antennas are required for determining an angle in two planes. However, such methods are expensive and complicated. Furthermore, a plurality of spatially offset RFID reading devices may be provided, thus enabling triangulation based on the received signal strength in order to narrow down the source of the reflections in a more exact manner. However, a plurality of stationary RFID reading devices are required for this purpose.

The technical object of the invention is therefore, inter alia, that of providing a method and/or a system which makes it possible to determine the distance between an RFID reading device and a deliberately selected RFID tag in a simple, robust manner, in which case the disadvantages from the prior art are intended to be eliminated and a simple, inexpensive, reliable system for measuring the distance and/or determining the position can be implemented. If possible, the intention is to be able to use commercially available RFID tags and for no existing radio standards to be exceeded.

This object is achieved, according to the invention, by a method in which the RFID reading device emits a query signal comprising a broadband signal;

the RFID tag modulates the query signal with a code signal and reflects it as a reflection signal;

the RFID reading device receives the reflection signal and obtains the code signal and a scattered broadband signal therefrom;

the RFID reading device determines a propagation time of the broadband signal by comparing the broadband signal with the scattered broadband signal;

the RFID reading device determines the distance between the RFID reading device and the RFID tag from the propagation time difference.

In the method according to the invention, a broadband signal of low power (in order to comply with the radio regulations) is superimposed on the carrier signal emitted by the RFID reading device during the reading phase. While the RFID tag is returning its data, the distance between the RFID reading device and the RFID tag can be determined by means of correlation. In this case, use is made of the property whereby the RFID tag changes its antenna input impedance during transmission, while all other reflectors do not do this the distance to the active RFID tag can therefore be determined in a targeted manner.

The propagation time of the broadband signal can be determined by correlating the broadband signal (the sign of which is possibly adapted in accordance with the received code signal) with the scattered broadband signal by means of a matching method (for example least-squares fit in the frequency domain) or other methods.

This method can be used to determine the distance to a back-scatter tag (regardless of whether it is active or passive). Directly measuring the distance makes it possible to carry out localization from an individual antenna or from a handheld device. Triangulating methods can also be supported with the distance measurement and considerably better results can thus be obtained. Furthermore, angle-estimating methods using a plurality of antennas may also be supplemented with a distance calculation.

The special method makes it possible to distinguish between the reflected signal and interfering reflections. Furthermore, multiple propagations can be detected and hidden. This reduces ambiguities in the determination of the position and results in a considerable improvement in comparison with triangulating methods.

Since the method according to the invention is a digital method based on samples, the correlation maximum can always be determined accurately only to one sample. In order to circumvent this, methods such as oversampling or upsampling can be used in a known manner. The propagation time can also be calculated in a more accurate manner using methods based in the frequency domain, for example by dividing the spectra of the transmission signal and of the reception signal whose sign has been corrected. In particular, if two path lengths differ only slightly from one another in the case of multipath propagation, resolution of the individual echoes may be only poorly possible even with oversampling, however. Since the autocorrelation function of a direct-sequence spread-spectrum sequence only becomes a sample beside the maximum of zero in the best case, it is not possible to distinguish between the two signal paths here.

For this reason, the invention may provide for the use of subspace algorithms to estimate the propagation time. Such algorithms are known in the field of digital signal processing and allow signals whose propagation time differs only slightly in the time domain to be separated even if the signals would be detected only as an individual path when using a purely correlative approach. Typical methods are, for example, "Estimation of signal parameters via rotational invariance techniques (ESPRIT)" and "Multiple signal classification (MUSIC)", but the list of methods which can be used is virtually infinite. A specific example of a method whose use may be provided according to the invention is found in the document "A high resolution time delay estimation technique in frequency domain for positioning system", Proc. IEEE Vehicular Technology Conference 2002, 2318.

According to the invention, provision may also be made for such subspace algorithms to also be used to estimate the angle (if a plurality of spatially separate antennas are used) in addition to estimating the propagation time. It has also been shown here that the use of said methods provides considerably better results than the use of signal correlation alone.

The invention is used in the RFID reading device and does not require any new or modified RFID tags. Conventional RFID tags, for example EPC Class 1 Gen 2 tags (the most widespread standard), can be used. The broadband signal may be in the form of a direct-sequence spread-spectrum signal, an OFDM signal or a chirp signal. Such signals have the advantage of a low spectral energy density, as a result of which other signals are not subject to interference and existing standards can be complied with.

According to the invention, the code signal may be in the form of a digital signal which is free of mean values. The duration of a sub-bit of the code signal may be an integer multiple of the period duration of the broadband signal. In particular, the duration of a sub-bit may comprise approximately 1.3 period durations of the broadband signal.

As a result of the fact that the code signal is free of mean values, it is possible for the broadband signals reflected by interferers to cancel each other out. Specifically, FM0 or Miller coding can be used, for example, but other types of coding are also provided according to the invention.

According to the invention, the scattered broadband signal can be multiplied by the respective sign of the code signal and can be added over a plurality of periods. The inventive multiplication of the received broadband signal by the respective sign of the code signal makes it possible to detect the tag involved in communication. If a code signal which is free of mean values is used, interference signals cancel each other out during this summation. However, a code signal which is not entirely free of mean values can also be used. As long as there are sufficient zeros and ones, it is also possible to work with signals which are not perfectly free of mean values and with intelligent summation.

The invention likewise provides for the summation to be carried out only over one period. For example, a tag may return "1" for a long time and may then return "0" for a long time—that is to say only one period. The invention likewise provides for a "0101010101 . . . " sequence or the like to be requested from the tag in order to measure the distance. The distance would then be measured using a dedicated auxiliary signal, rather than a data signal.

The distance between the RFID reading devices and the RFID tag can be determined using a method according to the invention, and the position of the RFID tag can be calculated from the known positions of at least one of the RFID reading devices.

Data can be transmitted between the RFID reading device and the RFID tag by means of modulated back-scattering. The invention also provides for the RFID tag to be in the form of a semi-active tag which uses, for example, active reflectors (RX antenna+modulator+amplifier+TX antenna), as is prescribed in the Austrian truck tolling system.

The carrier signal may be the form of a radio-frequency carrier signal. It may have a frequency of 850 MHz to 950 MHz. The RFID tag may be a passive RFID tag according to EPC Class1 Gen2.

The RFID reading device may additionally carry out an angle estimation in order to locate the RFID tag. For this purpose, provision may be made for a plurality of antennas or an antenna array to be provided on the RFID reading device.

According to the invention, the RFID tag may modulate the query signal with a code signal either by varying its antenna impedance or in the form of active modulation.

Furthermore, the invention extends to a system for locating an RFID tag using at least one RFID reading device, the RFID reading device comprising a data processing unit and at least one antenna, and the RFID tag comprising at least one antenna and a logic unit, wherein the RFID tag is set up to reflect a query signal, modulated with a code signal, as a reflection signal, the RFID reading device is set up to emit a query signal comprising a broadband signal modulated with a carrier signal and to obtain the code signal and a scattered broadband signal from the reflection signal, the data processing unit is set up to determine a propagation time difference between the broadband signal and the scattered broadband signal and to calculate the distance between the RFID reading device and the RFID tag therefrom.

The system may also comprise a data processing unit, which is connected or can be connected to the RFID reading devices, and a database, the positions of the RFID reading devices being stored in the database and the data processing unit being set up to calculate the position of the RFID tags from the positions of the RFID reading devices and the distances between the RFID reading devices and the RFID tags.

A plurality of antennas may be provided on the RFID reading device in order to estimate the angle in one or two planes.

If a spread-spectrum signal is used as the broadband signal, the period duration of the spread-spectrum sequence used can be selected according to the invention in such a manner that at least one full period of the spread-spectrum sequence always fits into a sub-bit of the code signal used irrespective of the data rate of the back-scattered signal (may vary by approximately +/−20%). In order to add the back-scattered signals, precisely one period may be removed from the data signal sub-bit center in this case. Since it is not known in advance how quickly exactly the tag back-scatters, these spread-spectrum periods always start at a different position. During summation, the signal section is therefore first of all cyclically rotated (it is known from the position how said signal section should lie), with the result that the "same" spread-spectrum periods are always added during summation.

The RFID tag may be in the form of a passive, active or semi-active RFID tag and may be set up to reflect the query signal, modulated with a code signal, as a reflection signal by varying its antenna impedance or by means of active modulation.

Further features according to the invention emerge from the claims, the description and the drawings.

The drawing schematically illustrates the subject matter of the invention in exemplary embodiments. In the drawing.

Figure 1:
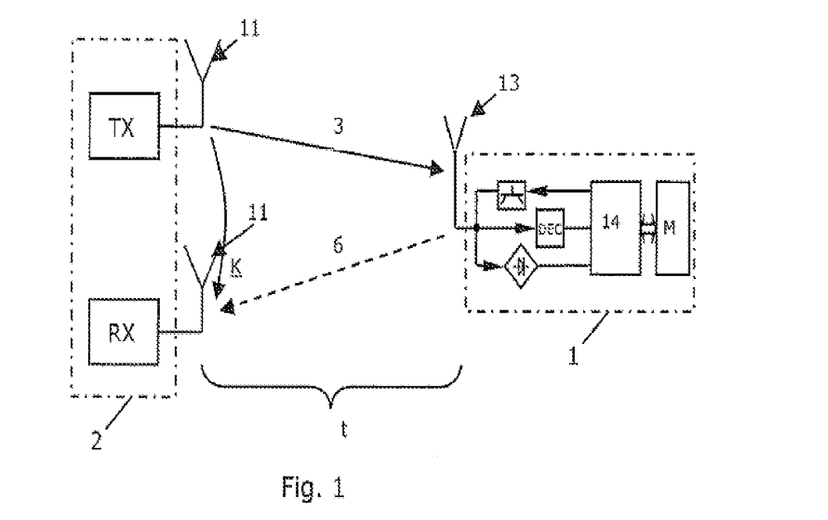
FIG. 1 shows a schematic illustration of one embodiment of the invention.

FIG. 1 shows an embodiment of a system according to the invention for locating an RFID tag 1 using an RFID reading device 2. The RFID tag 1 comprises an antenna 13, a logic unit 14 and apparatuses for supplying energy (rectifier), for decoding the received signal and for modulating the antenna impedance. Optionally, the logic unit may be connected to a memory, as shown in this exemplary embodiment.

The RFID reading device 2 has a transmitting part TX and a receiving part RX which are each provided with an antenna 11. Alternatively, provision may also be made for the RFID reading device 2 to not have any separate antennas but rather to have a common antenna and a circulator, directional coupler or the like for separating the transmitting and receiving directions.

The RFID reading device 2 first of all emits a query signal 3 which is received by the RFID tag 1, modulated with a data signal and back-scattered as a reflection signal 6.

At the same time, the query signal 3 is reflected by other interferers in the transmission range, as a result of which reception at the RFID reading device 2 is impaired. In addition, reception at the receiving part RX of the RFID reading device 2 is also subject to strong interference as a result of the coupling K to the transmitting part TX.

Figure 2:
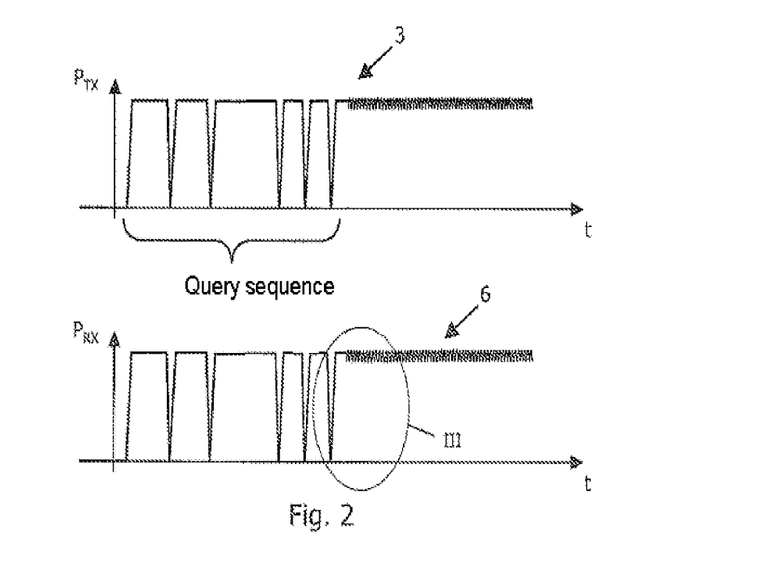
FIG. 2 shows a schematic illustration of the signal profiles in a method according to the invention.

FIG. 2 shows a schematic illustration of the signal profiles in a method according to the invention. The transmitted power $P_{TX}$ of the query signal 3 transmitted by the RFID reading device 2 first of all exhibits a query sequence in the form of a sequence of signal packets which are used to initialize and supply energy to the RFID tag 1.

The query signal 3 is composed of a narrowband radio-frequency carrier signal and a superimposed first broadband signal 4, the radio-frequency carrier signal having a frequency of approximately 865 MHz. The broadband signal 4 is in the form of a direct-sequence spread-spectrum signal, in which case the specific choice of the spreading code is irrelevant for the time being.

The broadband signal 4 modulated onto the carrier signal is schematically indicated in FIG. 2 as a radio-frequency oscillation. The power received by the receiving part of the RFID reader 2 is schematically shown as $P_{RX}$. In this case, the query sequence is repeated, followed by the actual reflection signal 6. The signal received by the receiving part RX consists primarily of the signal coupled over by the direct path K and of numerous interference signals and the sought signal from the RFID tag. The detail area III shown in FIG. 2 is shown in more detail in FIG. 3.

Figure 3:
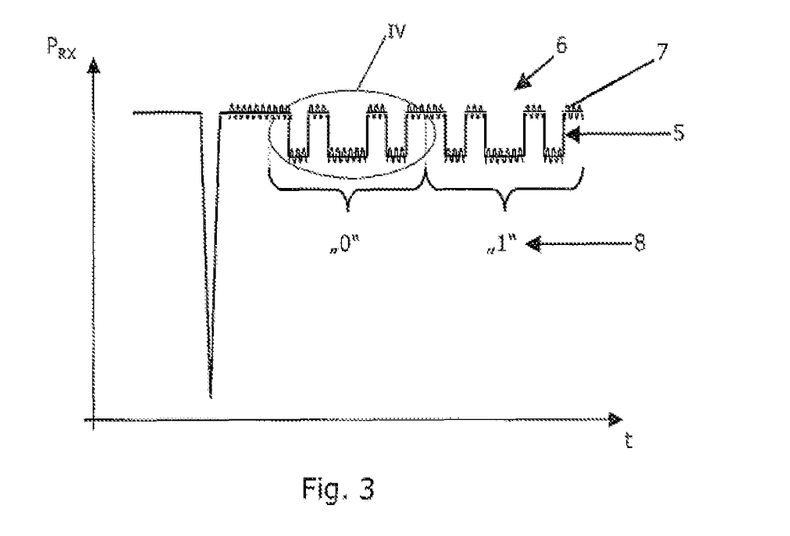
FIG. 3 shows a schematic illustration of detail III from FIG. 2.

FIG. 3 shows a schematic illustration of detail III of $P_{RX}$ from FIG. 2. It should be noted in this case that this is a simplified illustration of an operation which can actually only be outlined on the complex level and is used only for the fundamental understanding of the method.

The reflection signal 6 is generated by the RFID tag 1 by varying its antenna impedance with a data signal 8. The RFID tag 1 uses the data signal 8 to transmit, for example, its own invariable serial number, data relating to the identified object or other information.

The data signal 8 itself is not directly used for modulation but rather is transmitted in the form of a code signal 5 which is free of mean values. For example, in FIG. 3, the bit string "01" is transmitted using the shown code signal 5 which is free of mean values. A scattered broadband signal 7, which is temporally not identical to the transmitted broadband signal 4 on account of the finite propagation time between the RFID reading device 2 and the RFID tag 1, is superimposed on this code signal 5. The proportions shown are purely exemplary and do not restrict the invention in any way. For example, it is possible for the broadband signal 4 or the scattered broadband signal 7 to have a higher amplitude than the code signal 5. Detail IV is explained in more detail in FIG. 4.

Figure 4:
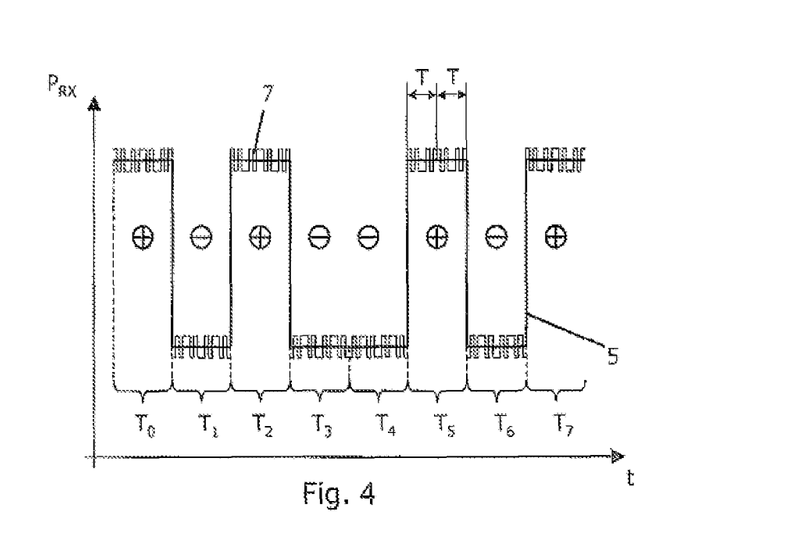
FIG. 4 shows a schematic illustration of detail IV from FIG. 3.

FIG. 4 shows a schematic illustration of detail IV from FIG. 3. One full period of the code signal 5 is shown. In the present case, a Miller sequence with M=4 was used for the code signal 5, but other ways of coding the data signal which are free of mean values are also provided. The exemplary code signal 5 comprises the eight time periods or sub-bits $T_0$ to $T_7$. The scattered broadband signal 7 is superimposed on the code signal 5 and has the period duration T. In the present case, the period duration T and the duration of a Miller time period (sub-bit) $T_i$ are selected in such a manner that approximately two periods of the broadband signal 4 or 7 fit into one time period (one sub-bit) $T_i$. This has the advantage that the scattered broadband signal 7 can be reconstructed in a more robust manner during the subsequent demodulation. However, it should be noted in this case that more periods need not necessarily result in more robust reconstruction since the bandwidth then increases and a plurality of band-limiting elements are involved in communication (antennas).

Figure 5A:
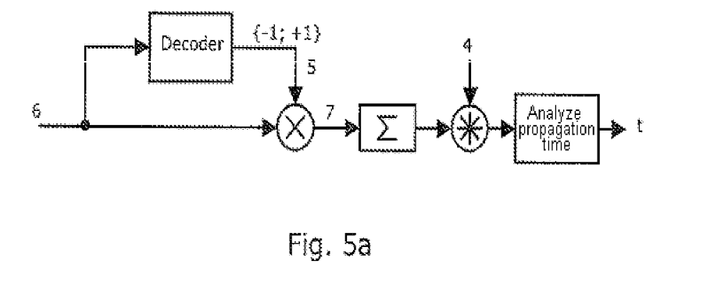
FIGS. 5a-5b show a schematic illustration of one embodiment of the inventive summation of a selected RFID tag and an interferer.

FIG. 5*a* shows a schematic illustration of the sequences in the RFID reader 2 for calculating the propagation time t of the broadband signal 4. The basis is the received reflection signal 6. The latter runs through a decoder which determines the sign of the code signal 5. The values +1 or −1 may be present at the output of the decoder. This is not the data signal 8 but rather only the code signal 5. The value at the output of the decoder is multiplied by the reflection signal 6 and a summation is then carried out.

Figure 5B:
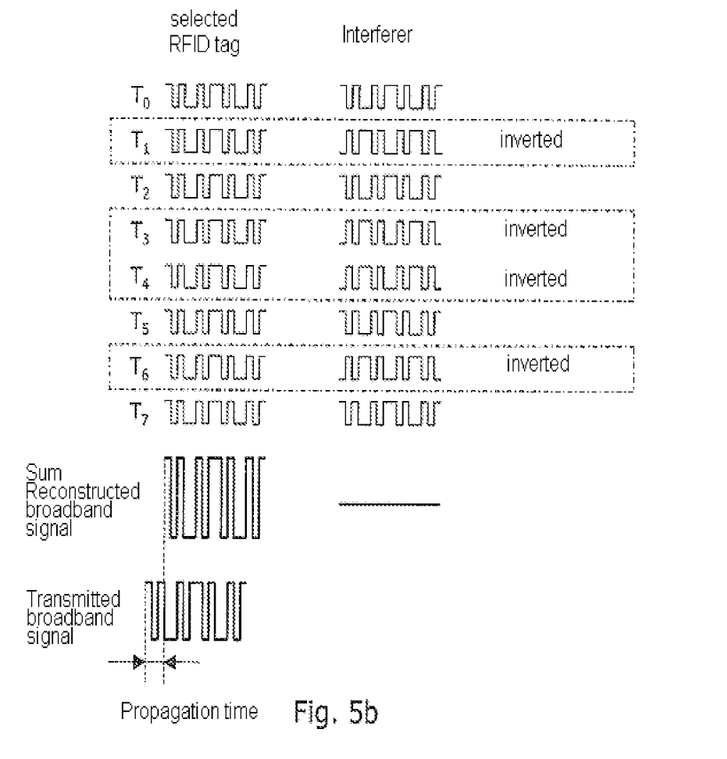

This method is illustrated by way of example in FIG. 5*b*. For the selected RFID tag, the decoder detects a negative sign in the time periods $T_1$, $T_3$, $T_4$ and $T_6$ (see FIG. 4) and multiplies the reflection signal 6 by −1.

This reverses the modulation in the RFID tag and the same broadband signal is present in each time period. In contrast to this, signals from interferers which have not been modulated with the code signal 5 cancel each other out. This shows the need to use a signal which is free of mean values or virtually free of mean values. The closer the mean value of the code signal 5 is to 0, the more exact the subsequent detection of the broadband signal 7. In addition, the number of summations also influences the accuracy of the method: the more periods are added, the more accurately the broadband signal 7 is reconstructed. For this purpose, provision may be made for the RFID reading device to request a multi-digit random number before the actual query in order to be able to clearly reconstruct the broadband signal therefrom. It goes without saying that any response from the tag, in particular the actual useful data, can be used for this purpose.

The RFID reading device 2 can determine the phase shift or the propagation time of the broadband signal 4 from the knowledge of the scattered broadband signal 7 and the transmitted broadband signal 4 in a known manner by means of correlation and can calculate the desired period of time t therefrom. This is likewise schematically shown in FIG. 5*b*.

Figure 6A:
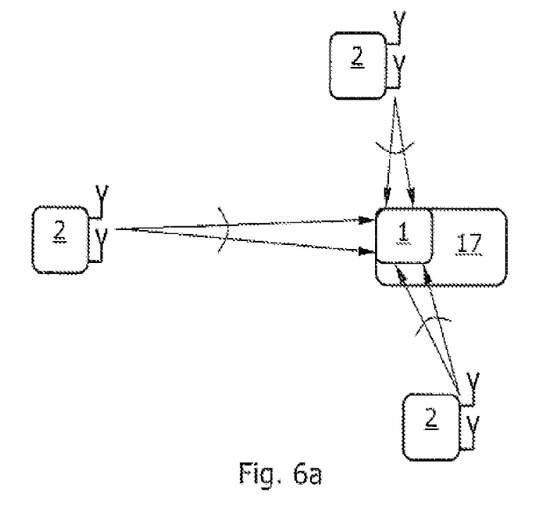
FIGS. 6a-6b show a further schematic illustration of embodiments according to the invention.
Figure 6B:
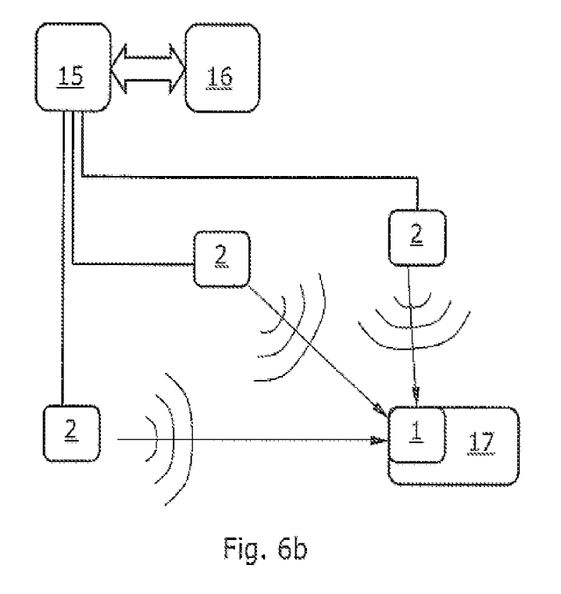

Finally, FIGS. 6*a*-6*b* show further embodiments of the system according to the invention. In the embodiment according to FIG. 6*a*, the RFID tag 1 is fastened to an object 17 to be located. Three RFID reading devices 2 whose positions are known are provided. Each RFID reading device 2 can determine the distance to the RFID tag 1 by carrying out the method according to the invention. In addition, provision may be made for the RFID reading devices 2 to have a plurality of antennas in order to carry out an angle estimation. Improved locating can be enabled from knowledge of the angle and distance.

In an exemplary embodiment according to FIG. 6*b*, provision may likewise be made for the RFID reading devices 2 to be connected to a central data processing unit 15 which in turn is connected to a database 16 containing the position data relating to the RFID reading devices 2. The central data processing unit 15 calculates the position of the RFID tag 1 and the object 17 associated with the latter from the position data and the distances calculated by the RFID reading devices 2.

The invention is not restricted to the exemplary embodiments illustrated but rather naturally also comprises other embodiments according to the invention. In particular, the invention is not restricted to the use of passive UHF RFID tags but rather also comprises active RFID tags, semi-active RFID tags and/or RFID tags operating in other frequency ranges, in which case communication can be carried out using modulated back-scattering or other methods.

LIST OF REFERENCE SYMBOLS

1 RFID tag
2 RFID reading device
3 Query signal
4 Broadband signal
5 Code signal
6 Reflection signal
7 Scattered broadband signal
8 Data signal
9 Data processing unit
10 Memory
11 Antenna
12 Transceiver
13 Antenna
14 Logic unit
15 Data processing unit
16 Database
17 Object

The invention claimed is:

1. A method for locating an RFID tag using at least one RFID reading device, the method comprising:
   emitting a query signal comprising a broadband signal by the RFID reading device;
   receiving by the RFID reading device a reflection signal from the RFID tag on which a code signal has been modulated by the RFID tag, and obtaining the code signal and a scattered broadband signal therefrom;
   comparing the broadband signal with the scattered broadband signal by the RFID reading device to determine a propagation time of the broadband signal; and
   determining a distance between the RFID reading device and the RFID tag from the propagation time difference by the RFID reading device,
   wherein receiving the reflection signal from the RFID tag and obtaining the code signal and the scattered broadband signal therefrom includes multiplying the scattered broadband signal by a sign of the code signal in the respective time period and adding a resulting product of the multiplying over one or more periods.

2. The method as claimed in claim 1 wherein the broadband signal is in the form of a direct-sequence spread-spectrum signal, an OFDM signal or a chirp signal.

3. The method as claimed in claim 1 wherein the comparing is carried out as a correlation or in the form of a matching method.

4. The method as claimed in claim 1, further comprising modulating the query signal with the code signal by the RFID tag and reflecting the modulate query signal as the reflection signal wherein the code signal is in the form of a digital signal which is free of mean values.

5. The method as claimed in claim 4 wherein a duration of a sub-bit of the code signal is an integer multiple of the period duration of the broadband signal.

6. The method as claimed in claim 4 wherein the code signal codes any desired data signal, in which case at least one of FM0 sequences, Miller sequences are used.

7. A method for determining the position of an RFID tag, in which case the position of one or more RFID reading devices is known, the method comprising:
- emitting a query signal comprising a broadband signal by the RFID reading device;
- receiving by the RFID reading device a reflection signal from the RFID tag on which a code signal has been modulated by the RFID tag, and obtaining the code signal and a scattered broadband signal therefrom;
- comparing the broadband signal with the scattered broadband signal by the RFID reading device to determine a propagation time of the broadband signal;
- determining a distance between the RFID reading device and the RFID tag from the propagation time difference by the RFID reading device; and
- calculating the position of the RFID tag from the known positions of at least one of the RFID reading devices,
- wherein receiving the reflection signal from the RFID tag and obtaining the code signal and the scattered broadband signal therefrom includes multiplying the scattered broadband signal by a sign of the code signal in the respective time period and adding a resulting product of the multiplying over one or more periods.

8. The method as claimed in claim 7 wherein data is transmitted between the RFID reading device and the RFID tag by means of modulated back-scattering.

9. The method as claimed in claim 8 wherein the carrier signal is in the form of a radio-frequency carrier signal and has a frequency of 850 MHz to 950 MHz.

10. The method as claimed in claim 9 wherein the RFID tag is a passive RFID tag according to EPC Class1 Gen2.

11. The method as claimed in claim 10, further comprising performing an angle estimation by the RFID reading device in order to locate the RFID tag.

12. The method as claimed in claim 11 wherein comparing the broadband signal with the scattered broadband signal includes executing one or more subspace algorithms to improve the determination of the propagation time and/or in order to estimate the angle.

13. The method as claimed claim 7 further comprising modulating the query signal with the code signal by the RFID tag and reflecting the modulate query signal as the reflection signal by at least one of: varying an antenna impedance.

14. The method as claimed in claim 13, further comprising emitting a dedicated auxiliary signal for distance measurement by the RFID tag.

15. A system for locating one or more RFID tags, the system comprising:
- at least one RFID reading device, the at least one RFID reading device comprising a data processing unit and at least one antenna, and the one or more RFID tags each comprising at least one antenna and a logic unit, wherein the one or more RFID tags reflect one or more query signals, modulated with a code signal, as one or more reflection signals, the RFID reading device is set up to emit one or more query signals comprising a broadband signal and to obtain the code signal and a scattered broadband signal from the reflection signals,
- the data processing unit of the at least one RFID reading device is set up to determine a propagation time difference by comparing the broadband signal with the scattered broadband signal and to calculate the distance between the RFID reading device and one or more RFID tags therefrom,
- wherein the RFID reading device obtains the code signal and the scattered broadband signal from the reflection signals by, at least in part, multiplying the scattered broadband signal by a sign of the code signal in the respective time period and adding a resulting product of the multiplying over one or more periods.

16. The system as claimed in claim 15, further comprising a central data processing unit, which is connected or can be connected to the at least one RFID reading device, and a database, the positions of the at least one RFID reading device being stored in the database and the central data processing unit set up to calculate the position of the one or more RFID tags from the positions of the RFID reading devices and the calculated distances between the RFID reading devices and the one or more RFID tags.

17. The system as claimed in claim 15, wherein the RFID reading device includes a plurality of antennas in order to estimate an angle in one or two planes.

18. The system as claimed in claim 15 wherein the one or more RFID tags are in the form of a passive, active or semi-active RFID tags.

* * * * *